(12) United States Patent
Denis

(10) Patent No.: US 10,543,552 B2
(45) Date of Patent: Jan. 28, 2020

(54) WELDING POWER SOURCE WITH CONFORMAL ANTENNA

(71) Applicant: Illinois Tool Works Inc., Glenview, IL (US)

(72) Inventor: Marc Lee Denis, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 658 days.

(21) Appl. No.: 14/651,089

(22) PCT Filed: Mar. 10, 2014

(86) PCT No.: PCT/US2014/022277
§ 371 (c)(1),
(2) Date: Jun. 10, 2015

(87) PCT Pub. No.: WO2014/150118
PCT Pub. Date: Sep. 25, 2014

(65) Prior Publication Data
US 2016/0016250 A1 Jan. 21, 2016

Related U.S. Application Data

(60) Provisional application No. 61/789,746, filed on Mar. 15, 2013.

(51) Int. Cl.
*B23K 9/10* (2006.01)
*H04W 4/80* (2018.01)
(Continued)

(52) U.S. Cl.
CPC .............. *B23K 9/1006* (2013.01); *B23K 9/12* (2013.01); *H04W 4/80* (2018.02); *H04W 84/18* (2013.01)

(58) Field of Classification Search
CPC ........ B23K 9/1006; B23K 9/12; H04W 4/008; H04W 84/18
(Continued)

(56) References Cited

U.S. PATENT DOCUMENTS 5,607,608 A 3/1997 Feldhausen
5,781,158 A * 7/1998 Ko ........................... H01Q 1/38
343/700 MS (Continued)

FOREIGN PATENT DOCUMENTS

CN 2247580 Y 2/1997
CN 1921427 A 2/2007
(Continued)

OTHER PUBLICATIONS

The International Search Report and Written Opinion dated Sep. 4, 2014 for International Application No. PCT/US2014/022277.
(Continued)

*Primary Examiner* — Thien S Tran
(74) *Attorney, Agent, or Firm* — McAndrews, Held & Malloy, Ltd.

(57) ABSTRACT

A welding system including a plurality of welding components (20, 21, 33, 43) communicating via a wireless system using low profile and planar antennas (40) is disclosed. The welding system comprises a welding power source (43) and one or more other welding system component(s) (20, 21, 33) communicating via Zigbee or other wireless communication networks. Communications are transmitted between the components (20, 21, 33, 43) of the welding system through antennas (40) mounted externally to the housing of the welding equipment(s) (20, 21, 33, 43). The antennas (40) can be low-profile planar antennas (40), either linearly or circularly polarized, which can be advantageously mounted to a housing while limiting undesirable contact with the (Continued)

environment and therefore to limiting the potential for damage.

6 Claims, 7 Drawing Sheets

(51) Int. Cl.
*B23K 9/12* (2006.01)
*H04W 84/18* (2009.01)

(58) Field of Classification Search
USPC .......... 219/130.01, 130.5, 132; 343/700 MS, 343/702, 705, 797, 841
See application file for complete search history.

(56) References Cited

U.S. PATENT DOCUMENTS

| | | | | |
|---|---|---|---|---|
| 2002/0122006 | A1* | 9/2002 | Crawford | H01Q 1/22 343/702 |
| 2007/0221636 | A1 | 9/2007 | Monzyk | |
| 2008/0102813 | A1* | 5/2008 | Chari | H01Q 1/283 455/424 |
| 2010/0108654 | A1* | 5/2010 | Ulrich | B23K 9/0953 219/130.5 |
| 2010/0147817 | A1 | 6/2010 | Laitala | |
| 2011/0248009 | A1 | 10/2011 | Long et al. | |
| 2011/0284500 | A1 | 11/2011 | Rappl et al. | |

FOREIGN PATENT DOCUMENTS

| | | |
|---|---|---|
| CN | 101536565 A | 9/2009 |
| CN | 201 708 353 U | 1/2011 |
| CN | 102239025 A | 11/2011 |

OTHER PUBLICATIONS

Zaiping Nie, Antenna Engineering Handbook, Jul. 31, 2014, pp. 519-544, 581-588 and 886-887.

Lin, Changlu, Antenna Engineering Handbook, Jun. 30, 2002, pp. 463-466 and 770-771.

Canadian Office Action Appln No. 2,891,946 dated Dec. 17, 2018 (9 pgs.).

Chicago Electric Welding Systems, "130 Amp TIG/90 AMp Arc Welder Model 91811 Assembly and Operating Instructions", http://Powertool.manualsonline.com/manuals/mfg/chicago_electric/model_91811.html?p=1, 2004.

Canadian Office Action Appln No. 2,891,946 dated Jan. 8, 2018 (5 pgs.).

* cited by examiner

WELDING POWER SOURCE WITH CONFORMAL ANTENNA

CROSS-REFERENCE TO RELATED APPLICATIONS

This application represents the U.S. National Stage of International Application No. PCT/US2014/022277, filed Mar. 10, 2014 which claims the benefit of U.S. Provisional Patent Application Ser. No. 61/789,746 filed on Mar. 15, 2013, which is incorporated herein by reference in its entirety.

FIELD OF THE INVENTION

The present invention is directed to welding systems, and more particularly to planar antennas for wireless communications between components in welding systems.

BACKGROUND OF THE INVENTION

Welding systems used in industrial welding cells typically include a variety of specialized pieces of equipment that are interconnected to perform a weld. The equipment can include, for example, a welding power source, a wire feeder, and automation equipment, such as an automation controller, robot, or fixed automation components. Weld cables carry power and wire to a workpiece to be welded, and are a necessary component of the system. Communications between the components and other devices are typically also carried by wires or cables. A typical system is shown, for example, in FIG. 1. Here, a welding power source 108 is shown connected to a robot controller 105, robot 101, wire feed motor 102, and a gas valve 103 through a series of cables 104, 106, and 107. Weld cables 109 and 112 provide power to the workpiece 110 and corresponding wire electrode. A voltage feedback cable 109 provides feedback signals to the power source 108. The remaining cables generally carry communications, including command signals and feedback signals, between the components of the welding cell.

There are advantages to carrying communication signals by wire, as shown here. Wired communications are typically more immune to noise from electromagnetic fields associated with welds, and disturbances caused by associated equipment, like high frequency starters. Because welding equipment is used in an industrial environment, however, cabling causes a number of problems. For example, it is often important to minimize the overall size or footprint of a welding cell. Cables are problematic, however, because when routed between the various pieces of equipment, the cables can reduce the area available for a weld operator to move within the cell. Additionally, when improperly positioned, wires and cables can be damaged by forklifts and other equipment used in the industrial environment.

It is, therefore, desirable to interconnect the welding equipment in a welding cell or other installation using wireless communications. The electrical and electronic circuits used in welding equipment, however, are generally encased in steel housings or cabinets. Typical wireless communications modules or systems use on-board chips or printed antennas that are formed on a printed circuit board, which are not effective in a steel housing, and therefore need to be mounted externally. Industrial equipment is often subject to environmental damage, when operators, for example, use the equipment to store tools, as a platform for welding, or for other unplanned uses. External antennas, therefore, can be easily damaged.

Furthermore, because the equipment is used in confined, typically indoor locations, and closely spaced to other welding cells and equipment, there is often no clear line of sight between a transmitter and a receiver in the welding system. Instead communication signals are reflected or "bounced" along multiple paths before finally being received. Each of these bounces can introduce phase shifts, time delays, attenuations, and distortions that can destructively interfere with one another at the aperture of a receiving antenna. As described above, moreover, the welding environment is particularly prone to noise problems. This issue is exacerbated in many countries where the power level of wireless transmissions is limited by law. Additionally, the close proximity of adjacent cells can lead to interference and confusion about the appropriate wireless network to be used.

The disclosed system addresses these and other issues.

SUMMARY OF THE INVENTION

In one aspect of the disclosure, a welding power source is provided including a power supply for producing weld power, a wireless communications system coupled to the power supply, and a housing enclosing the power supply and the wireless communications system. The housing includes a substantially vertical front panel, a substantially vertical rear panel offset a distance from the front panel, and a right and a left side panel, the right and left side panels extending between the front and rear panels, thereby defining a space for receiving the power supply and the wireless communications system between the front, rear, right and left panels. A portion of each of the right and left side panels extends beyond a plane defined by each of the front and rear panels, and an upper panel encloses the space. A portion of the upper panel extend beyond the plane defined by each of the front and rear panels. A conformal planar antenna is coupled to at least one of the front and the rear panels, and to the wireless communications system. The conformal planar antenna is mounted adjacent the portion of the upper panel extending beyond the at least one of the front and rear panels, and adjacent the portion of one of the right and left side panels extending beyond the at least one of the front and rear panels to protect the conformal planar antenna from damage.

The wireless communications system can be in communication with at least one of a robot controller, a wire feeder, a gas valve, and a programmable logic controller, and can be, for example, a Zigbee network. The low-profile conformal antenna can be a circularly polarized antenna, or a microstrip planar antenna.

In another aspect, the present disclosure provides a welding system comprising a welding power source and at least one other welding system component. The welding power source includes a power supply, a wireless communications device, and a circularly polarized antenna coupled to the wireless communications device. A controller is operatively coupled to the power supply and the wireless communications device. The welding system component comprises a second wireless communications system, coupled to a second circularly polarized antenna. The controller is programmed to control the power supply to generate welding power and to command the wireless communications device to communicate at least one of a command and a feedback signal to the welding system component through the circularly polarized antenna.

In another aspect, the welding power source can be contained within a housing, and the circularly polarized antenna is coupled to at least one of a front and a rear panel of the housing.

In another aspect, the welding system component can comprise at least one of a robot controller, a wire feeder, a gas valve, and a programmable logic controller. The wireless communication device and the second wireless communications device can communicate via a Zigbee network.

In yet another aspect, the disclosure provides a welding system component comprising a controller, a wireless communications device in communication with the controller, and a housing enclosing the controller and the wireless communications device. A substantially flat conformal planar antenna is coupled to the housing and to the wireless communications system. The wireless communications device is adapted to communicate with other welding system components in a welding system through a wireless communications system. The antenna can comprise a circularly polarized antenna, or a microstrip planar antenna. The welding system component can comprises at least one of a welding power source, a robot controller, and a wire feeder. The conformal planar antenna can be mounted to at least one of a front and a rear panel of the housing and adjacent the portion of the upper panel extending beyond the at least one of the front and rear panels. For example, the conformal planar antenna can be mounted to one of a front and a rear panel of the housing, and adjacent a portion of one of a right and a left side panel extending beyond the at least one of the front and rear panels to protect the conformal planar antenna from damage.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE DRAWINGS

The figures herein use prior art monopole antennas to illustrate how and where generally flat conformal antennas can be mounted to the system. These illustrations are exemplary of antenna location, and are not intended to illustrate the types of antennas described herein.

DETAILED DESCRIPTION OF THE INVENTION

Figure 1:
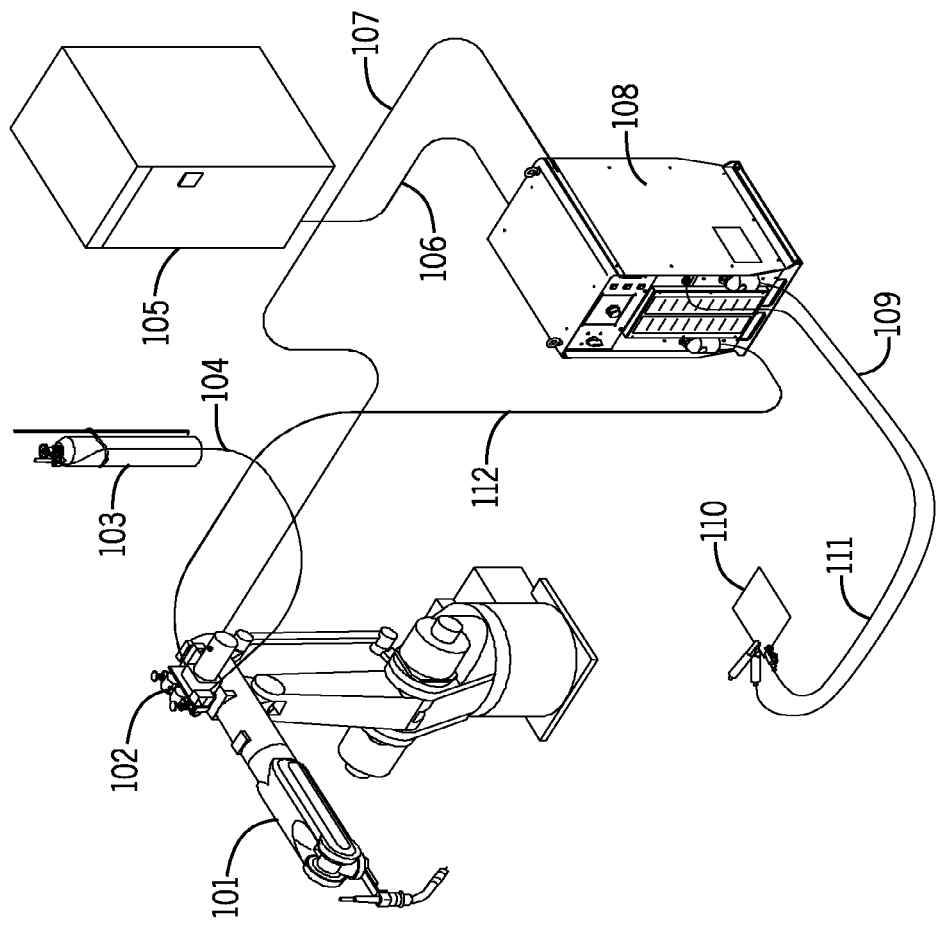
FIG. 1 is a perspective view of a prior art welding cell with wired communications between the components of the cell.
Figure 2:
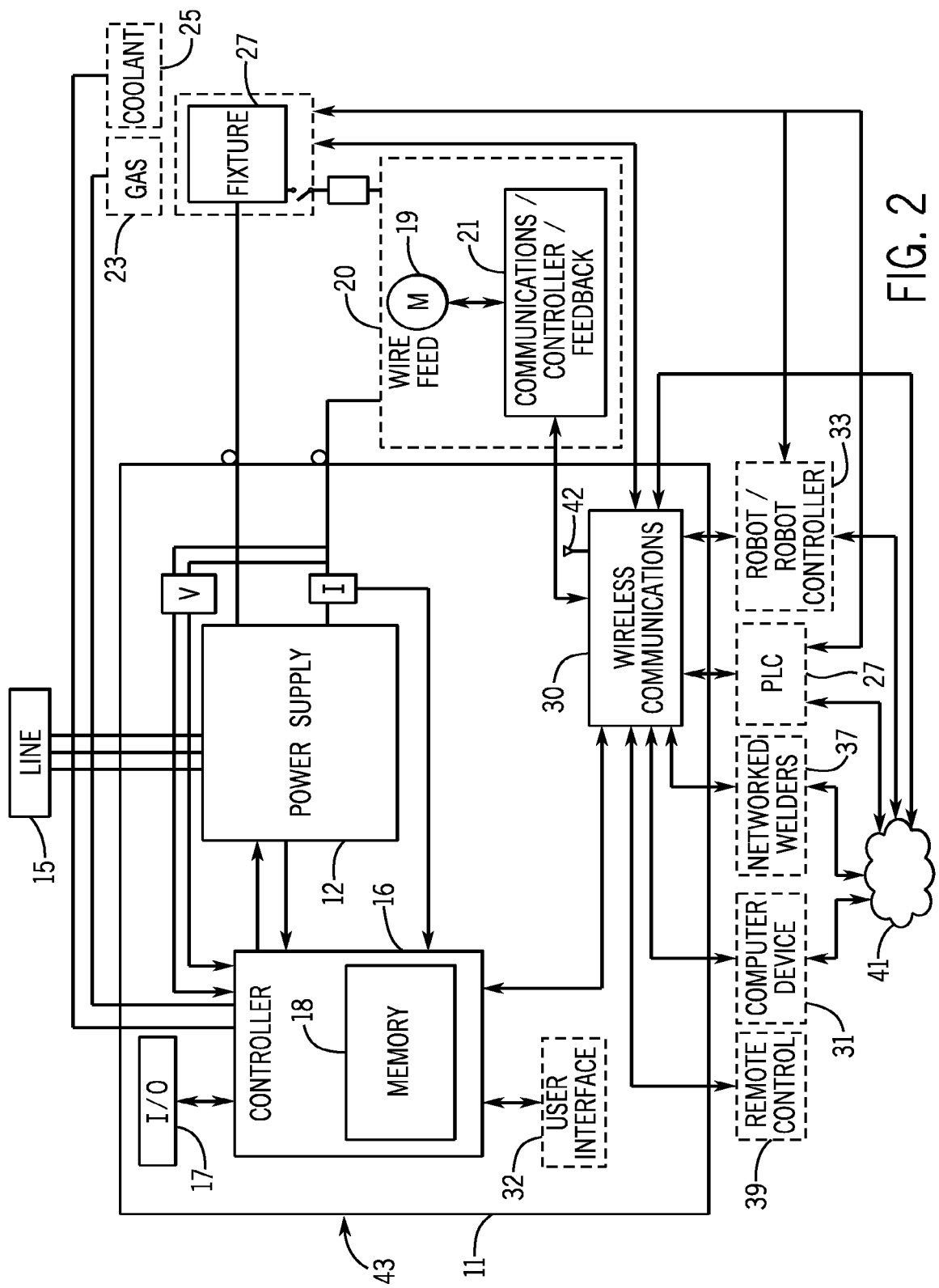
FIG. 2 is a block diagram of a welding system capable of use in the present invention.

Referring now to the Figures and more particularly to FIG. 2, an exemplary block diagram of a welding system 10 for manual, semi-automatic, and automatic welding that can be used in accordance with the present invention is shown. The welding system 10 includes a welding power supply 12, a controller 16, and a communications system 30 for wirelessly communicating with external components. The controller 16 of welding system 10 can further be optionally connected to external welding components including a wire feed system 20, a gas valve 23 and a coolant system 25.

Referring still to FIG. 2, as discussed above, in some applications welding system 10 can include or be connected to a wire feed system 20 which typically includes a motor 19 that drives wire through drive rolls and a liner to a torch or gun 13. As shown here, the wire feed system 20 can also include a controller 21 for controlling the wire feed motor 19 and providing wireless communications to other components of the system 10. When a wire feed system 20 is not used, the power supply 12 can supply power to a torch or other electrode.

Referring still to FIG. 2, the gas valve 23 can be either an on/off valve, a metered valve controlled by controllers 16 or 21, or can include a separate or integral flow meter. Similarly, when a coolant system is provided, the system can include an on/off or metered valve, and flow metering devices. Although not shown here, the gas valve 23 could also include a communications device for wireless communications with other components of the system.

Referring still to FIG. 2, the controller 16 can include one or more microcontroller, microprocessor, digital signal processor, or other programmable controller, along with one or more internal or external memory component 18, capable of storing weld configuration data and control code for controlling the power supply 12, as described more fully below. The power supply 12 can be a constant current power supply, a constant voltage power supply or a constant voltage/constant current power supply, and preferably includes pulsing capabilities, as discussed more fully below. The power supply can comprise a switching or inverter power supply that rectifies the line power 15 and then switches the DC power into a step down transformer to produce the desired welding voltage or current, and/or a transformer that converts the high voltage and low current electricity from the utility mains into a high current and low voltage, or include other types of power supplies.

Communications between the controller 16, operators, and external components can be provided through one or more of a user interface 32, the wireless communications system 30, and input/output communications connector 17. A user interface 32 can include a user display and input devices, such as keys, switches, joysticks, analog or digital potentiometers, or other devices to provide information to and receive information from an operator or user of the welding system 10, or be a graphical touch screen or other graphical display. The user interface can, for example, be mounted in a housing 11 with the power supply 12 and controller 16, or be provided in a separate housing from the power supply 12. Although shown connected to the controller 16 in FIG. 2, the user interface 32 can also be connected as a remote control 37 through communications system 30. One or more user interface 32 can be provided in welding system 10. Collectively, the components within housing 11 are referred to as the welding power source 43.

The communications system 30 provides wireless communications using any of a number of possible communication protocols such as Zigbee, Bluetooth, GSM, WiFi, I.E.E.E. 802.11, I.E.E.E. 802.15.4, I.E.E.E. 802.15.1, ANT, and other public or proprietary wireless radio links using radio hardware or other wireless protocols. The communications system 30 can be linked to the components of a welding cell, including the wire feed system 20, flexible or hard automation components, such as a welding robot 21, a programmable logic controller (PLC) 27, and fixtures 29. Alternatively, or additionally, the external components can include one or more computer, computerized device or computer network 31, or a series of networked welding systems 37. Computerized devices can include, for example, cellular telephones, tablet devices, laptops, and personal digital assistants.

Referring still to FIG. 2, an exemplary input/output connector (I/O connector) 17, which provides connection points for external equipment to provide input signals to the welding system 10 and to receive discrete outputs and feed back signals from the welding system 10 is shown. The inputs and outputs can include, among other indicators, welding process state conditions and error conditions. Common welding process state condition signals input and output through the I/O connector 17 can include, for example, triggering signals for triggering a weld or welding sequence, contactor on (weld on), coolant on, high frequency on (HF on), gas valve on (purge), wire feed motor foreword (jog), wire feed motor reverse (retract), weld program selection, and touch sense detect. Common error conditions can include, for example, voltage sense error, arc start error, wire stick errors, motor over current errors, coolant flow errors, or gas flow errors. Analog input and output signals, including amperage command and feedback, voltage command and feedback, wire feed command and feedback, and current feedback can also be provided on the I/O communications connector 17. Welding state data, error data, feedback and command data can also be transmitted to and from the welding system 10 through communications system 30 discussed above. The I/O communications connector 17 can be configured as a printed circuit board, terminal connector board, or other type of hardware connector. Alternatively, the I/O communications connector could provide communications using a known communications protocol such as RS-232, RS485, Bluetooth, Zigbee and other protocols.

Referring still to FIG. 2, external devices, such as a handheld gun or torch or other device with a trigger switch, a robot controller 33 associated with robot 21, PLC 27, a remote control 39, or a remote system and display such as an externally connected PC, can provide a signal to the controller 16 of the welding system 10 to start a weld. The weld parameter commands can be retrieved from memory 18, or be provided from the robot 21, PLC 27, or other external device through communications system 30, or selected at the user interface 32. Each of these remote devices and the wireless communications can be in communication with external networks, such as the internet 41.

Referring still to FIG. 2, the welding system 10 is connected to an input power supply line 15, typically a three phase supply, which provides power both for the control circuitry, for the welding power supply 12, and in some cases for the wire feed system 20. Voltage and current sensors (not shown) can be provided on the input power supply line to allow the power supply to be monitored, typically by controller 16. The welding power supply 12 can be an inverter power supply, and, as described above, can be a constant current (CC), constant voltage (CV), or a constant voltage/constant current (CV/CC) power supply. The power source can provide AC, DC or selectable AC/DC output, and can include pulsing capabilities. Depending on configuration, the power source can provide the ability to perform TIG (GTAW). MIG(GMAW) welding, pulsed TIG (GTAW-P), pulsed MIG (GMAW P), fluxcored (FCAW) welding, and other types of welding processes.

Figure 3:
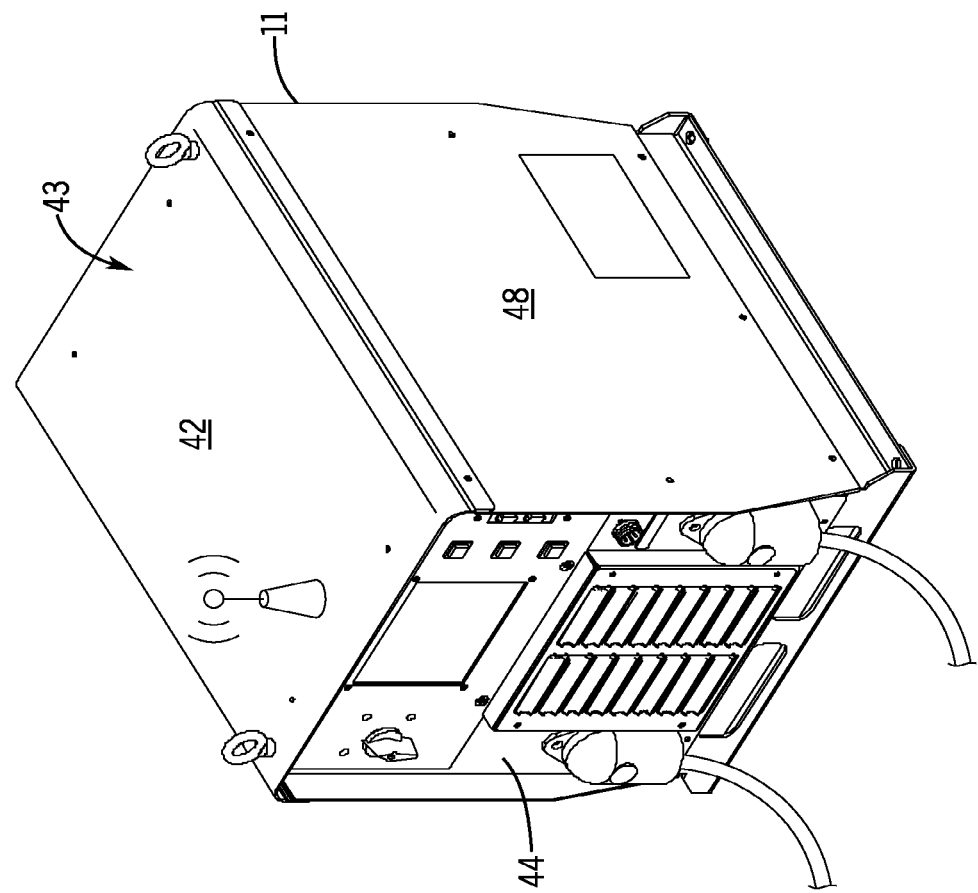
FIG. 3 is a perspective view of a welding power source including an antenna for wireless communications with other components of the welding cell.
Figure 4:
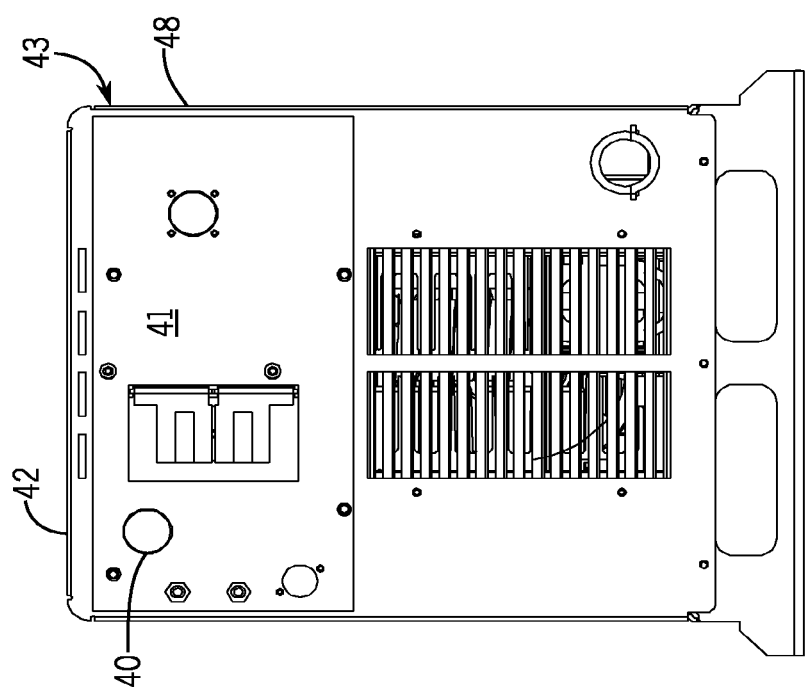
FIG. 4 is rear view of the welding power source of FIG. 3, illustrating an alternate mounting location for the antenna.

Referring now to FIGS. 3 and 4, in one embodiment of the invention, the components of the welding system 10 communicate through a wireless network or communications system, such as Zigbee. Two or more components of the welding system 10 include antennas 40 that can be coupled to, for example, the housings of the components, as illustrated by welding power source 43 described below. The antennas can be used to transmit signals between the components in the welding system 10, described above, and/or to a central computer or monitoring station, which may include the internet.

In one embodiment, a microstrip-planar or conformal antenna can be used. A conformal antenna can be, for example, fabricated by etching the antenna element pattern in metal trace bonded to an insulating dielectric substrate, such as a printed circuit board, with a continuous metal layer bonded to the opposite side of the substrate which forms a ground plane. Commercial embodiments of antennas of this type are available, for example, from Taoglas Antenna Solutions, Enniscorthy, Co. Wexford, Republic of Ireland.

The microstrip antenna can be constructed in any number of different shapes, including squares, rectangular, cylindrical, circular and elliptical, and can therefore be constructed to meet many different types of transmission and configuration requirements. These antennas, therefore, have a very low profile, are mechanically rugged, and can be shaped to conform to the surface of a housing in an industrial environment, including flat surfaces and curved surfaces. These types of antennas, therefore, can be constructed and mounted to minimize potential for damage, while still providing consistent communications between components in the system.

In some embodiments of the invention, the antennas can be circularly polarized antennas. The circularly polarized antenna provides a rotating electromagnetic field vector. In typical circularly-polarized antennas, the plane of polarization rotates in a corkscrew pattern making a complete revolution during each wavelength, and radiates energy in the horizontal and vertical planes, and every plane in between. The antennas can be right-hand-circular (RHC), with clockwise rotation in the direction of propagation, or left-hand-circular (LHC), with counterclockwise rotation. For correct and lowest loss reception the transmit and receive antennas must share the same polarization. In some applications, the rotation can be selected to be different in adjacent cells.

Circular polarization provides a number of advantages. Because the circular polarized antenna, for example, sends and receives in all planes, signals can be more easily received and read than when using traditional linear systems. The signals are less likely to be absorbed by materials that the signal comes into contact with than a linearly polarized system. Because the reflected signal is returned in the opposite orientation, largely avoiding conflict with the propagating signal, a circularly-polarized signal is also much better at penetrating and bending around obstructions than a linearly polarized antenna, and can operate without a clear line of sight path. Circularly polarized antennas also are not affected by multi-path problems that can be caused when the primary signal and the reflected signal reach a receiver at nearly the same time, resulting in an "out of phase" condition.

In a welding cell environment, when electromagnetic waves are reflected from a low impedance electric surface such as a sheet of steel, the polarization of the electromagnetic field is reversed in phase. Thus, a Right Hand Circular Polarized (RHCP) wave when reflected becomes Left Hand Circular Polarized (LHCP). Circular polarized antennas typically show insensitivity to the opposite polarization and so reflected electromagnetic waves arriving at the receive antenna are reduced in amplitude as presented to the receiver and the resulting wave interference is greatly minimized, and provides an improved performing wireless communications performance, and more effective data transfer in a weld cell environment.

Figure 5:
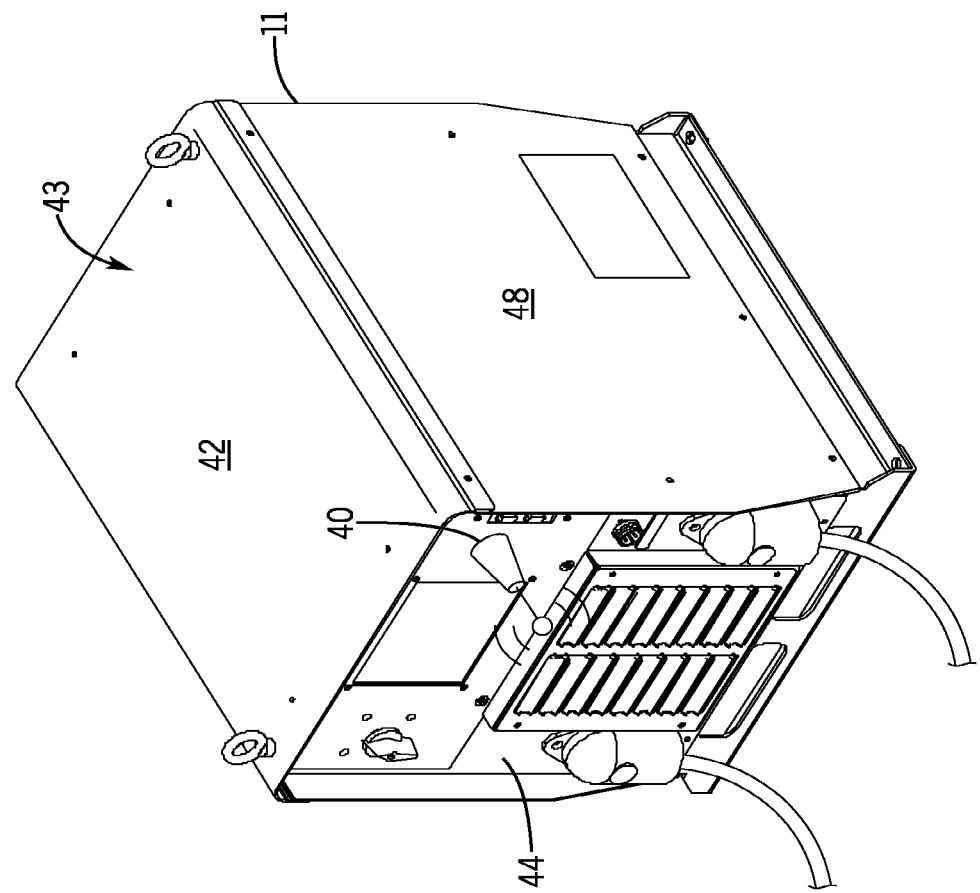
FIG. 5 is front view of the welding power source of FIG. 3, illustrating another alternate mounting location for the antenna.

Referring again to FIGS. 3, 4, and 5, an antenna of the type described above can be connected to the communications system 30 and mounted or otherwise coupled to the housing 11 of the welding power source 43 to provide wireless communications to other components. The antenna 40 can be, for example, mounted to the upper panel 42 of the housing 11, as shown in FIG. 3. However, to minimize potential damage to the antennas 40, the antennas can also be advantageously mounted to a front 44 (FIG. 5) or rear panel 46 (FIG. 4) of the housing 11. As shown here, the upper panel 42 and side panels 48 of the housing 11 can extend beyond the planes formed by front panel 44 and rear panel 46, such that an antenna 40 mounted to the front panel or rear panel 46 is protected from access both at the top and sides. The housing 11, therefore, helps to protect the antenna 40 from damage by weld cables moved through the welding cell, and from tools, reels of wire, welding helmets, gloves, or other implements positioned on the upper panel of the housing by welding operators or other users of the system.

The circularly polarized antenna can be provided as a linear antennas or antenna array with quadrature feed manifolds to feed different linearly polarized antennas with variable amplitude and phase signals from one common source such that the multiple linear antennas form a rotating electromagnetic (EM) field vector. The antennas can be printed or etched on a laminar substrate (printed circuit board material) with etched defects or other added structures so as to form circular polarization.

Figure 6:
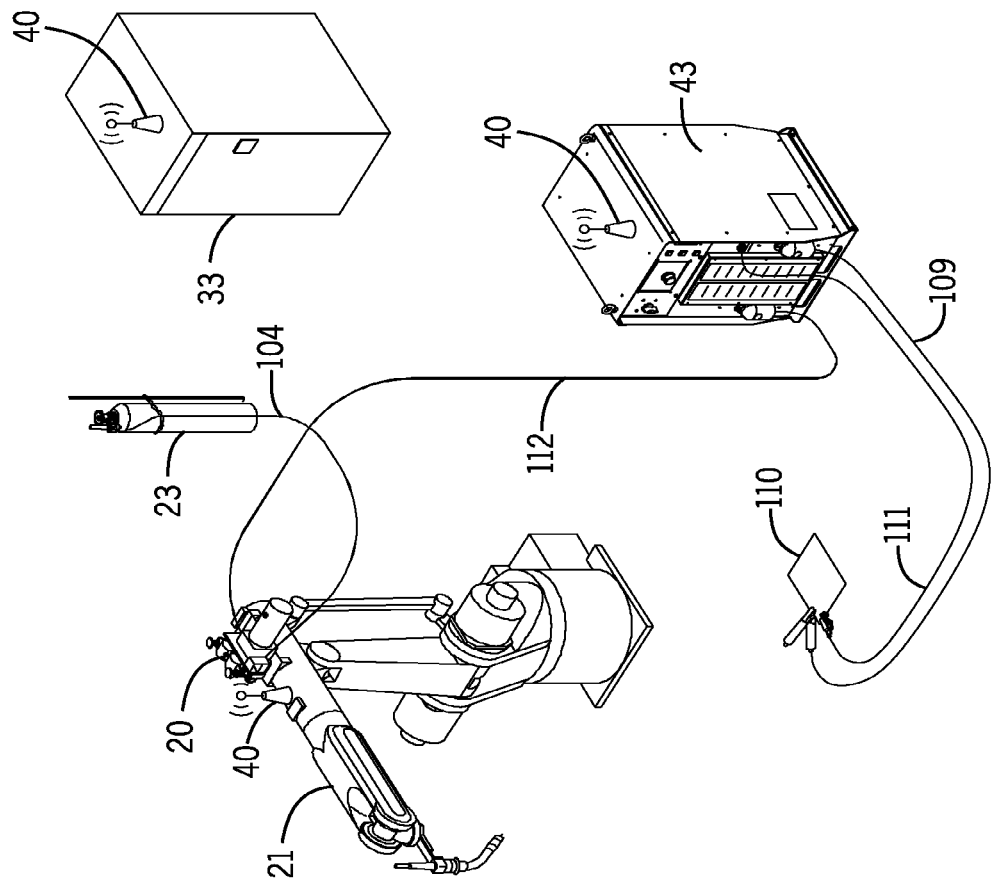
FIG. 6 is a perspective view of a robotic welding cell using antennas in accordance with the disclosed system.

Referring now to FIG. 6, a welding cell employing antennas 40 in accordance with the disclosure is shown. As shown here, an antenna 40 is coupled to the welding power source 43, to a robot controller 33, to a robot 21, and to the wire feed system 20 here shown mounted to the robot. In operation, command signals and feedback signals are transmitted between the welding power source, 12, robot controller 33, robot 21, and wire feed system 20. In operation, control signals for controlling a weld can originate from one or more of the components of the welding system 10. For example, a user can program data for controlling the weld at the interface 32 associated with the welding power source 43, and data for controlling the robot from the robot controller 33. Alternatively, control of the welding power source 43 and the robot 21 can be provided from the robot controller 33. Both the welding power source 43 and robot controller 33 can also be connected through the wireless communications system 30 to a remote system storing weld program data that can be retrieved and used to control both the robot 21 and welding power source 43.

Figure 7:
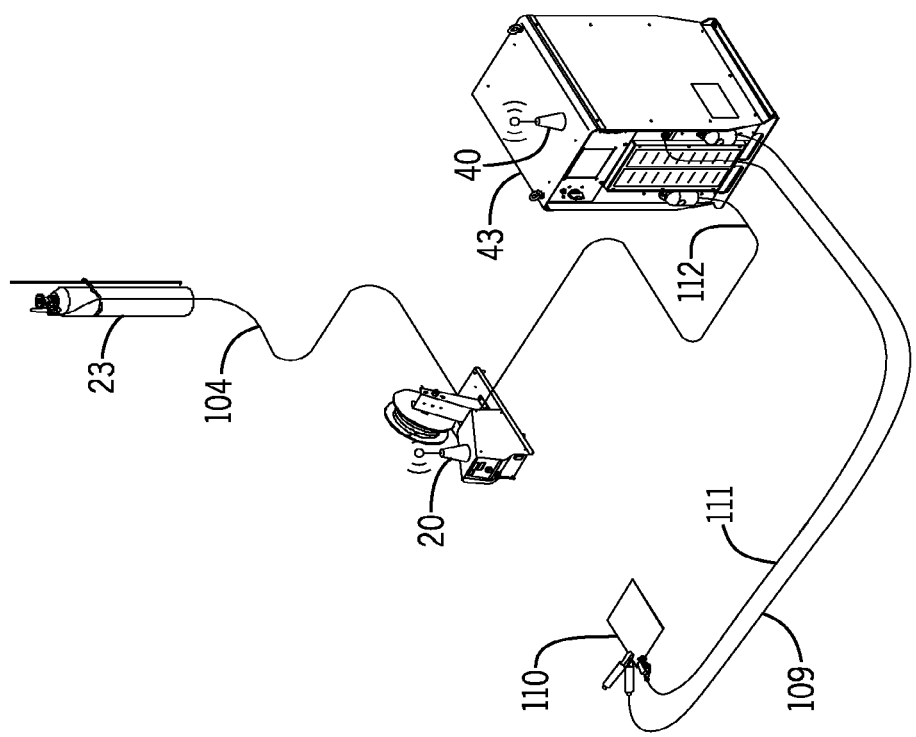
FIG. 7 is a perspective view of a handheld welding cell using antennas in accordance with the disclosed system.

Referring now to FIG. 7, a handheld welding system 60 is shown. Here, the welding system includes a welding power source 43 and a handheld wire feed system 20. Each of the welding power source 43 and wire feed system 20 includes an internal controller, communication devices for wireless communications between the components of the system, and circularly-polarized antennas 40 for communication between the components of the system. The antennas 40 are illustrated on the upper surface 42 of power source 43, and on an upper surface 62 of wire feed system 20. As discussed above, the antennas 42 can also be advantageously positioned on the front or rear panels of the respective welding power source and wire feed components, where the antennas are protected by the overhanging top and side portions of the respective housings.

In operation, therefore, the disclosed wireless communications system and corresponding antennas provide a number of advantages over prior welding art systems. For example, the disclosed system reduces the number of cables required in a given welding cell or installation. Additionally, the circularly polarized and microstrip antennas advantageously provide for communications links to be established between welding system components in enclosed industrial environments, and where welding components are closely spaced together, avoiding the multi-path and "bouncing" problems encountered which can be encountered with other types of systems. The circularly polarized antenna reduces multipath signals without a need for active switching, provides the ability to use active polarization switching to choose a polarity for a particular radio network, and provides the ability to provide multiple networks on the same frequency, by using diversity of polarity.

It should be understood that the methods and apparatuses described above are only exemplary and do not limit the scope of the invention, and that various modifications could be made by those skilled in the art that would fall within the scope of the invention. For example, the welding system described above with reference to FIG. 2 is shown by way of example only. As described above, there are many possible welding power sources and corresponding components that could be used. Furthermore, while specific controllers and communication systems are described above, these descriptions are intended to describe functional aspects, and are not intended to limit the scope of the invention. Various hardware and software configurations can be used, and any number of processing devices can be used to provide the functions described. These devices can be provided in a single housing or distributed in multiple housings and locations. The hardware schematics are also provided by way of example, and are not intended to limit the invention.

Furthermore, although a housing is shown in FIG. 2 encompassing several components of the welding system 10, the communications devices, interfaces, controllers, and power source shown can be arranged in housings in various ways. For example, in some applications it is desirable for user interfaces and communications systems to be provided in remote devices. In other applications, these devices can be provided in the housing 11 with power supply 12. In some applications it may be desirable for interfaces to be provided both within and remote to the power supply. Various methods of arranging these components will be apparent to those of ordinary skill in the art.

What is claimed is:

1. A welding system component comprising:
 a controller;
 a wireless communications device in communication with the controller;
 a housing enclosing the controller and the wireless communications device, wherein the housing includes:
  a substantially vertical front panel;
  a substantially vertical rear panel offset a distance from the front panel;
  a right and a left side panel, the right and left side panels extending between the front and rear panels, the front, rear, right and left panels defining a space for receiving the power supply and the wireless communications system between the front, rear, right and left panels, an edge of each of the right and left side panels extending beyond a plane defined by each of the front and rear panels;

an upper panel enclosing the space, an edge of the upper panel extending beyond the plane defined by each of the front and rear panels; and a flat conformal planar antenna coupled to at least one of the front and the rear panels, and to the wireless communications system, the conformal planar antenna mounted adjacent the edge of the upper panel extending beyond the at least one of the front and rear panels, and adjacent the edge of one of the right and left side panels extending beyond the at least one of the front and rear panels to protect the conformal planar antenna from damage;

the flat conformal planar antenna coupled external to the housing and to the wireless communications system, the wireless communications device adapted to communicate with other welding system components in a welding system through a wireless communications system.

2. The welding system of claim 1, wherein the flat conformal planar antenna comprises a circularly polarized antenna.

3. The welding system of claim 1, wherein the flat conformal planar antenna comprises a microstrip planar antenna.

4. The welding system of claim 1, wherein the welding system component comprises at least one of a welding power source, a robot controller, and a wire feeder.

5. The welding system of claim 1, wherein the conformal planar antenna is mounted to at least one of a front and a rear panel of the housing and adjacent the edge of the upper panel extending beyond the at least one of the front and rear panels.

6. The welding system of claim 1, wherein the conformal planar antenna is mounted to one of a front and a rear panel of the housing, and adjacent the edge of one of a right and a left side panel extending beyond the at least one of the front and rear panels to protect the conformal planar antenna from damage.

* * * * *